(12) United States Patent
Saito et al.

(10) Patent No.: US 10,184,530 B2
(45) Date of Patent: Jan. 22, 2019

(54) ELECTROMAGNETIC CONNECTION DEVICE

(71) Applicants: NTN CORPORATION, Osaka (JP); OGURA CLUTCH CO., LTD., Gunma (JP)

(72) Inventors: Takahide Saito, Shizuoka (JP); Koji Sato, Shizuoka (JP); Naotsugu Kitayama, Shizuoka (JP); Yoshihiro Kurosu, Gunma (JP); Haruhiko Ushirode, Gunma (JP)

(73) Assignees: NTN CORPORATION, Osaka (JP); OGURA CLUTCH CO., LTD., Gunma (JP)

( * ) Notice: Subject to any disclaimer, the term of this patent is extended or adjusted under 35 U.S.C. 154(b) by 0 days.

(21) Appl. No.: 15/315,673

(22) PCT Filed: May 28, 2015

(86) PCT No.: PCT/JP2015/065375
§ 371 (c)(1),
(2) Date: Dec. 1, 2016

(87) PCT Pub. No.: WO2015/186595
PCT Pub. Date: Dec. 10, 2015

(65) Prior Publication Data
US 2017/0198760 A1 Jul. 13, 2017

(30) Foreign Application Priority Data
Jun. 4, 2014 (JP) .................. 2014-115480

(51) Int. Cl.
*F16D 27/112* (2006.01)
*F16D 27/14* (2006.01)
*F16D 13/40* (2006.01)

(52) U.S. Cl.
CPC ............ *F16D 27/112* (2013.01); *F16D 27/14* (2013.01); *F16D 13/40* (2013.01); *F16D 2300/22* (2013.01)

(58) Field of Classification Search
None
See application file for complete search history.

(56) References Cited

U.S. PATENT DOCUMENTS

| 4,804,075 A | 2/1989 | Koitabashi |
| 5,372,228 A | 12/1994 | Vanlaningham et al. |

FOREIGN PATENT DOCUMENTS

| CN | 87104822 A | 2/1988 |
| CN | 87106854 A | 6/1988 |

(Continued)

OTHER PUBLICATIONS

Office Action received for Chinese Patent Application No. 201580029912.4, dated Mar. 27, 2018, 10 pages (4 pages of English Translation and 6 pages of Office Action).

(Continued)

*Primary Examiner* — Robert W Hodge
*Assistant Examiner* — Ryan P Dodd
(74) *Attorney, Agent, or Firm* — Womble Bond Dickinson (US) LLP

(57) ABSTRACT

An electromagnetic connection device includes an armature (4), a rotor (3), an electromagnetic coil (14), and a spring member (24) that biases the armature (4) in a direction in which the armature (4) is separated from the rotor (3). The electromagnetic connection device includes a damping member (25) mounted on the armature (4) so as to face the rotor (3). The armature (4) includes a flat portion (22) and a tubular portion (8). The damping member (25) includes a damper cover (26) including an abutment portion along the flat portion (22) and an engaging portion along the tubular (Continued)

portion (8), and an elastic member (27) sandwiched between the abutment portion and the flat portion (22). The damper cover (26) is put on the armature (4) from the side of the rotor (3) and movably held on the tubular portion (8). The flat portion (22) includes a concave portion (35) configured to store the abutment portion of the damper cover (26). There is provided an electromagnetic connection device capable of obtaining a high damping effect and raising the productivity while preventing the elastic member from being exposed to a friction surface.

3 Claims, 4 Drawing Sheets

(56) References Cited

FOREIGN PATENT DOCUMENTS

| CN | 201747820 U | 2/2011 |
|---|---|---|
| CN | 201916038 U | 8/2011 |
| DE | 19925173 A1 | 12/2000 |
| JP | S62-017431 A | 1/1987 |
| JP | H05-042773 U | 6/1993 |
| JP | H09-329157 A | 12/1997 |
| JP | 2009-293564 A | 12/2009 |
| JP | 2009-293654 A | 12/2009 |
| JP | 2011-169381 A | 9/2011 |
| JP | 2013-113382 A | 6/2013 |

OTHER PUBLICATIONS

International Search Report and Written Opinion received for PCT Patent Application No. PCT/JP2015/065375, dated Aug. 25, 2015, 12 pages (6 pages of English Translation and 6 pages of Original Document).

International Preliminary Report on Patentability received for PCT Patent Application No. PCT/JP2015/065375, dated Dec. 15, 2016, 10 pages (6 pages of English Translation and 4 pages of Original Document).

European Search Report and Written Opinion received for EP Patent Application No. 15802629.4, dated Jan. 19, 2018, 7 pages.

ELECTROMAGNETIC CONNECTION DEVICE

TECHNICAL FIELD

The present invention relates to an electromagnetic connection device such as an electromagnetic brake or an electromagnetic clutch. More specifically, the present invention relates to an electromagnetic connection device including a damping member that reduces a strike sound generated when an armature is attracted by an attraction target member.

BACKGROUND ART

A conventional electromagnetic brake or electromagnetic clutch includes an armature that is attracted by a magnetic force to an attraction target member. The armature and the attraction target member are made of a metal. For this reason, when the armature is attracted by a magnetic force to the attraction target member, a strike sound as a metallic sound is generated by the collision of the metal members. The strike sound may give an unpleasant feeling or instability, and is preferably as small as possible.

DESCRIPTION OF RELATED ART

A conventional electromagnetic connection device capable of reducing the strike sound is described in, for example, patent literature 1 or 2.

The electromagnetic connection device disclosed in patent literature 1 includes a damping member sandwiched between an armature and an attraction target member. The damping member includes an elastic member formed into an annular plate shape and an annular plate-shaped wear resisting member fixed to the elastic member. The material of the elastic member is a rubber or resin material.

The damping member is stored in an annular groove that is open to the friction surface of the attraction target member. In a state in which the damping member is mounted on the attraction target member, the wear resisting member of the damping member projects from the friction surface of the attraction target member to the armature side.

The elastic member of the damping member is compressed when the armature is pushed against the wear resisting member. Hence, in the electromagnetic connection device described in patent literature 1, since a shock generated by the attraction of the armature by the attraction target member is reduced by the elastic member, the strike sound becomes small.

The electromagnetic connection device disclosed in patent literature 2 includes a damping member that performs damping using magnetism generated when an armature is attracted by an attraction target member. The attraction target member described in patent literature 2 includes a first annular groove that is open to the friction surface, and a second annular groove that is open to the opposite side of the armature. The second annular groove stores an electromagnetic coil.

The first annular groove and the second annular groove communicate with each other via a plurality of communication holes. The shaft portion of the damping member extends through the communication holes.

The damping member includes an annular plate-shaped friction portion stored in the first annular groove, an annular plate-shaped actuator portion stored in the second annular groove, a shaft portion that connects the friction portion and the actuator portion, and a spring member that biases the actuator portion to the opposite side of the armature. The shaft portion extends through the spring member. The spring member is inserted while being compressed between the actuator portion and the bottom of the second annular groove. In a state in which the electromagnetic coil is not energized, the friction portion is stored in the first rotor when the actuator portion is pushed to the electromagnetic coil side by the spring member.

When the electromagnetic coil is energized, and the actuator portion is magnetically attracted by the bottom of the second annular groove, the friction portion projects from the first annular groove to the armature side. That is, the friction portion of the damping member contacts the armature before the attraction target member when the armature is attracted by the attraction target member. Hence, in the electromagnetic connection device described in patent literature 2, a shock generated by the attraction of the armature by the attraction target member is reduced when the armature presses the damping member against the magnetic attraction that acts on the actuator portion of the damping member.

RELATED ART LITERATURE

Patent Literature

Patent Literature 1: Japanese Patent Laid-Open No. 9-329157
Patent Literature 2: Japanese Utility Model Laid-Open No. 5-42773

DISCLOSURE OF INVENTION

Problem to be Solved by the Invention

The elastic member described in patent literature 1 supports the wear resisting member in a state in which the armature is spaced apart from the attraction target member. For this reason, the elastic member needs to be formed into a shape capable of properly supporting the wear resisting member. If the support of the wear resisting member is unstable, the friction surface of the wear resisting member may tilt and contact the armature in the state in which the armature is spaced apart from the attraction target member. Hence, there are constraints to the shape of the elastic member. The shape of the elastic member is limited to, for example, a plate shape.

When the elastic member has a plate shape, it is impossible to raise the damping effect by using the elastic member of a material hard to elastically deform. The reason for this is as follows. When a plate-shaped elastic member that can hardly elastically deform is used, the moving speed of the armature that moves while compressing the elastic member decreases, and the time necessary from the start of energization of the electromagnetic coil to the magnetic attraction of the armature by the attraction target member becomes long. Hence, since the response in magnetic attraction of the armature by the attraction target member lowers, the elastic member of a material capable of obtaining a high damping effect cannot be used, as described above.

This problem can be solved to some extent when the shape of the elastic member is changed by employing an arrangement that brings the elastic member into contact with the armature without using a wear resisting member. However, when this arrangement is employed, the elastic member wears, or wear powder generated by the wearing scatters. In addition, the elastic member may crack.

The damping member described in patent literature 2 is formed by combining a plurality of parts. In an operation of assembling the damping member, an operation of assembling the damping member to the attraction target member needs to be done simultaneously. When assembling the damping member, first, a plurality of shaft portions are mounted on the friction portion. Next, the shaft portions are extended through the communication holes of the attraction target member, and the spring member is fitted on the shaft portions projecting into the second annular groove. The actuator portion is welded to the small-diameter portion at the distal end of the shaft portion in the second annular groove.

In the electromagnetic connection device using the damping member described in patent literature 2, since the operation of assembling the damping member is complex, the productivity is low.

The present invention has been made to solve the above-described problems, and has as its object to provide an electromagnetic connection device capable of obtaining a high damping effect and raising the productivity while preventing an elastic member from being exposed to a friction surface.

Means of Solution to the Problem

In order to achieve the above object, according to the present invention, there is provided an electromagnetic connection device comprising an armature that includes a contact surface formed at one end and is movable along an axis perpendicular to the contact surface, an attraction target member including a contact surface configured to come into contact with the contact surface of the armature when the armature moves, a movement of the attraction target member in a direction along the axis being regulated, an electromagnetic coil that generates a magnetic flux passing through the armature and the attraction target member and causes the attraction target member to magnetically attract the armature, a spring member that biases the armature in a direction in which the armature is separated from the attraction target member along the axis, and a damping member that is mounted on a first member that is one of the armature and the attraction target member, and faces a second member that is the other, wherein the first member includes a first wall forming a contact surface to the second member, and a second wall extending along the axis from an edge portion of the first wall to an opposite side of the second member, the damping member comprises a damper cover including an abutment portion extending along the first wall and an engaging portion extending along the second wall and an elastic member fixed to the abutment portion so as to be sandwiched between the first wall and the abutment portion of the damper cover, the damper cover is put on the first member from a side of the second member, and when the engaging portion engages with the second wall, held on the second wall so as to be movable along the axis, and the first wall includes a concave portion configured to store the abutment portion of the damper cover pushed by the second member in a process of attracting the armature to the attraction target member.

Effects of the Invention

In the electromagnetic connection device according to the present invention, the damper cover of the damping member and the second member come into contact with each other in the process of magnetically attracting the armature to the attraction target member. When the first member and the second member approach each other from that state, the elastic member is compressed between the first member and the abutment portion of the damper cover.

The kinetic energy of the armature decreases when the elastic member elastically deforms in this way. The abutment portion of the damper cover is stored in the concave portion of the first member in the process of magnetically attracting the armature to the attraction target member. After that, the armature is magnetically attracted by the attraction target member in a state in which the kinetic energy has decreased.

Hence, according to the present invention, it is possible to provide an electromagnetic connection device that generates a small strike sound when the armature is magnetically attracted by the attraction target member. The elastic member is never exposed to the friction surface of the first member and never contacts the second member. Hence, the elastic member does not wear upon contact with the second member, and no wear powder of the elastic member is generated.

The elastic member is supported by the first member via the damper cover. For this reason, since the degree of freedom of the shape of the elastic member becomes high, the elastic member can be formed into a shape capable of relatively easily elastically deforming even if a material hard to elastically deform is used as the material of the elastic member. It is therefore possible to obtain the damping member whose response and damping effect are both high.

The damper cover is put on the first member that is one of the armature and the attraction target member so as to support the elastic member, and held on the second wall of the first member.

For this reason, the damping member can easily be mounted on the first member.

Hence, according to the present invention, it is possible to provide an electromagnetic connection device capable of obtaining a high damping effect and raising the productivity while preventing the elastic member from being exposed to the friction surface.

BEST MODE FOR CARRYING OUT THE INVENTION

An electromagnetic connection device according to an embodiment of the present invention will now be described in detail with reference to FIGS. 1 to 7. In this embodiment, an example in which the present invention is applied to an electromagnetic clutch will be explained.

Figure 1:
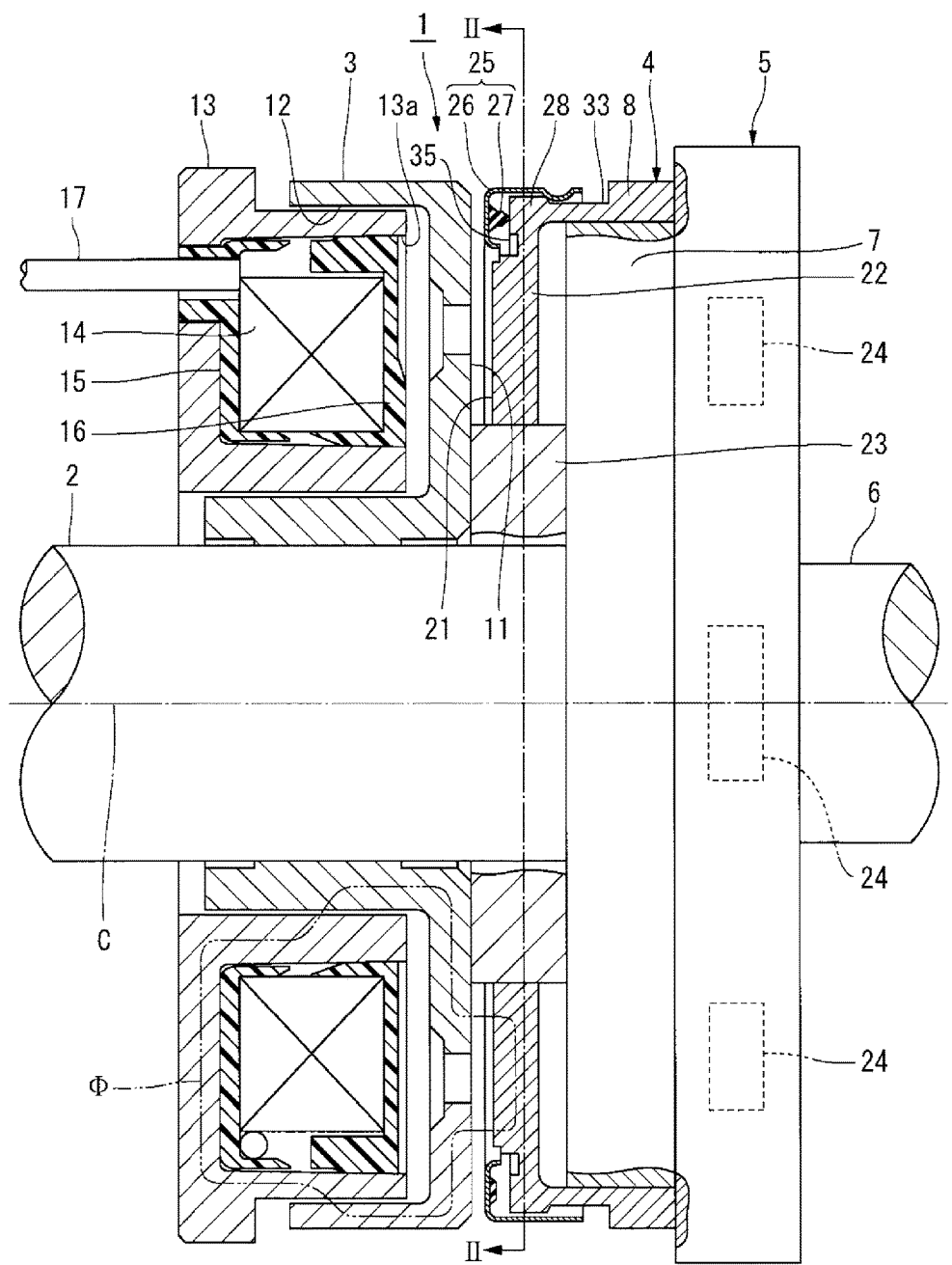
FIG. 1 is a longitudinal sectional view of an electromagnetic connection device according to the present invention.

An electromagnetic clutch 1 shown in FIG. 1 constitutes the electromagnetic connection device according to the present invention, and includes a rotor 3 through which an input shaft 2 extends, and an armature 4 facing the rotor 3.

The input shaft 2 is connected to a driving device (not shown). The driving device has a function of switching between an operation state in which the input shaft 2 rotates in a forward direction and an operation state in which the input shaft 2 rotates in a reverse direction. The input shaft 2 is connected to an output shaft 6 via a two-way clutch 5. The two-way clutch 5 is equivalent to that disclosed in, for example, Japanese Patent Laid-Open No. 2013-174345.

The two-way clutch 5 has a function of switching between an engaging state in which the rotation of the input shaft 2 is transmitted to the output shaft 6 and a disengaging state in which the input shaft 2 can rotate with respect to the output shaft 6. If the two-way clutch 5 is in the engaging state, the rotation of the input shaft 2 is transmitted to the output shaft 6 irrespective of the rotation direction of the input shaft 2. If the two-way clutch 5 is in the disengaging state, the input shaft 2 freely rotates with respect to the output shaft 6 irrespective of the rotation direction of the input shaft 2.

The two-way clutch 5 includes a switching member 7 configured to switch between the engaging state and the disengaging state. The switching member 7 can move in the axial direction of the input shaft 2 with respect to the remaining members of the two-way clutch 5. When the switching member 7 moves leftward in FIG. 1 (in a direction in which the armature 4 (to be described later) is magnetically attracted by the rotor 3), the two-way clutch 5 is set in the disengaging state. When the switching member 7 moves rightward in FIG. 1, the two-way clutch 5 is set in the engaging state. Note that the moving directions of the switching member 7 are not limited to those described above, and may be directions reverse to those described above.

The switching member 7 is press-fitted in a tubular portion 8 of the armature 4 (to be described later) and moves integrally with the armature 4.

The rotor 3 of the electromagnetic clutch is formed by a magnetic material into an annular shape. The input shaft 2 is press-fitted in the axial portion of the rotor 3. That is, the rotor 3 is mounted on the input shaft 2 in a state in which its movement in the axial direction of the input shaft 2 is regulated, and rotates integrally with the input shaft 2. In this embodiment, the rotor 3 constitutes an "attraction target member" and a "second member" in the present invention.

A friction surface 11 (contact surface) is formed on a portion of the rotor 3 facing the armature 4. An annular groove 12 that is open to the opposite side of the armature 4 is formed in the rotor 3 on the opposite side of the armature 4. A field core 13 is inserted into the annular groove 12 without being in contact with the rotor 3. The field core 13 includes an electromagnetic coil 14 wound into an annular shape, and is fixed to a fixing housing (not shown).

The electromagnetic coil 14 is covered with a coil bobbin 15 and a coil cover 16 and stored in the field core 13. A lead wire 17 is connected to a winding end of the electromagnetic coil 14. The lead wire 17 extends through the coil bobbin 15 and is guided to the outside of the field core 13. The coil bobbin 15 holds one end of the electromagnetic coil 14 in the axial direction. The electromagnetic coil 14 is fitted in the coil bobbin 15. The coil cover 16 is put on the other end of the electromagnetic coil 14 in the axial direction and locked by a caulking piece (not shown) at an opening portion 13a of the field core 13.

The armature 4 is formed by a magnetic material into a predetermined shape. When the electromagnetic coil 14 is excited, the armature 4 forms a magnetic circuit to pass a magnetic flux $\Phi$ in cooperation with the rotor 3. The armature 4 according to this embodiment includes a flat portion 22 formed into an annular plate shape with a friction surface 21 (contact surface) facing the friction surface 11 of the rotor 3, and the tubular portion 8 extending from the edge of the flat portion 22 on the periphery side to the opposite side of the rotor 3. In this embodiment, the armature 4 corresponds to a "first member" in the present invention. The flat portion 22 of the armature 4 constitutes a "first wall" in the present invention, and the tubular portion 8 constitutes a "second wall" in the present invention. When the armature 4 moves toward the rotor 3, the friction surface 21 of the flat portion 22 comes into contact with the friction surface 11 of the rotor 3.

A support member 23 extends through the axial portion of the flat portion 22. The support member 23 is formed into an annular shape and located on the same axis as that of the annular flat portion 22. The flat portion 22 is supported on the outer surface of the support member 23 so as to be movable in the axial direction and the circumferential direction.

The input shaft 2 extends through the axial portion of the support member 23. The support member 23 is press-fitted and fixed on the input shaft 2.

The inner surface of the armature 4 is fitted on the support member 23 so as to be rotatable and movable in the axial direction of the input shaft 2. That is, the armature 4 can move along an axis (an axis C of the input shaft 2) perpendicular to the friction surface 21 and can also rotate about the axis C of the input shaft 2 with respect to the rotor 3.

The tubular portion 8 according to this tubular portion is formed into a cylindrical shape and mounted on the switching member 7 of the two-way clutch 5, as described above. The armature 4 according to this embodiment is biased in a direction to separate from the rotor 3 by a spring member 24 provided on the two-way clutch 5. In a state in which the electromagnetic coil 14 is not energized, the armature 4 is held at a position apart from the friction surface 11 of the rotor 3 by a predetermined air gap G (see FIG. 6).

A damping member 25 is mounted on the outer periphery of the armature 4, as shown in FIG. 1. The damping member 25 includes a damper cover 26 facing the rotor 3, and an elastic member 27 fixed to the damper cover 26. The damping member 25 is put, from the side of the rotor 3, on a corner portion 28 formed at the connection portion between the flat portion 22 and the tubular portion 8 of the armature 4.

Figure 6:
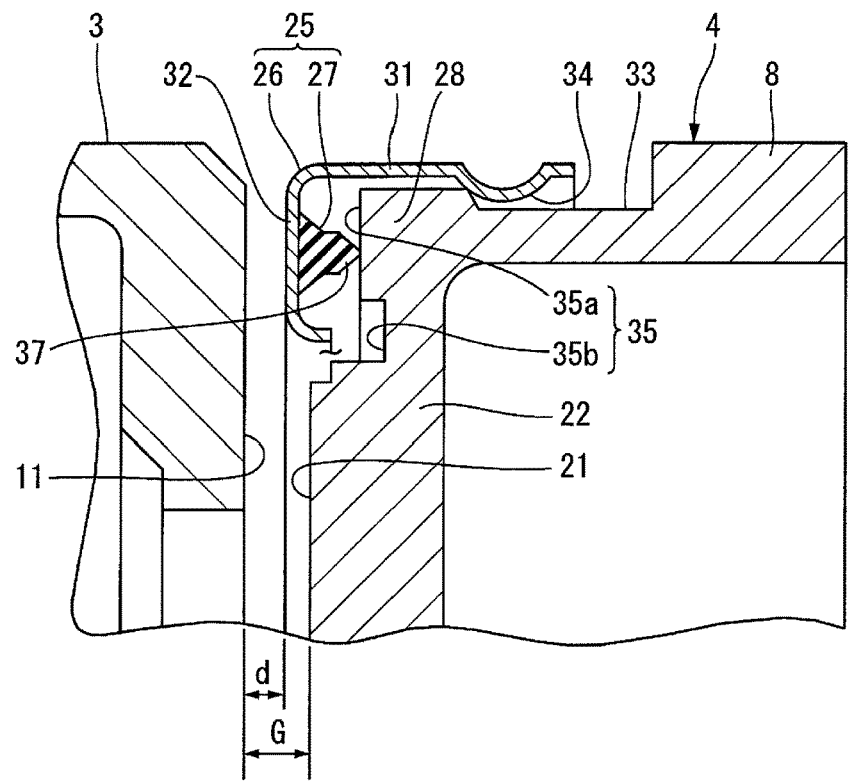
FIG. 6 is a sectional view showing an enlarged main part of the electromagnetic connection device according to the present invention, which illustrates a non-connection state.

The damper cover 26 is formed by bending a metal plate into a predetermined shape and held by the tubular portion 8 so as to be movable in a direction along the axis C of the input shaft 2. As shown in FIG. 6, the damper cover 26 according to this embodiment includes an engaging portion 31 formed into a cylindrical shape extending in the axial direction along the outer surface of the tubular portion 8, and an annular plate-shaped abutment portion 32 extending from one end of the engaging portion 31 inward in the radial direction along the flat portion 22.

A plurality of projections 34 that engage with an annular groove 33 formed in the outer surface of the tubular portion 8 are formed on the engaging portion 31. The projections 34 according to this embodiment are formed by making part of the engaging portion 31 partially project inward in the radial direction by compression molding. The projections 34 are provided at positions apart at a predetermined interval in the circumferential direction of the engaging portion 31. The projections 34 are formed at positions indicated by symbol A in FIG. 2. The groove width of the annular groove 33 is larger than the formation width of the projections 34. The formation width of the projections 34 is the length of the projections 34 in the axial direction of the input shaft 2. For this reason, the engaging portion 31 detachably engages with the tubular portion 8 so as to be allowed to move in the direction along the axis C by a predetermined length.

Figure 7:
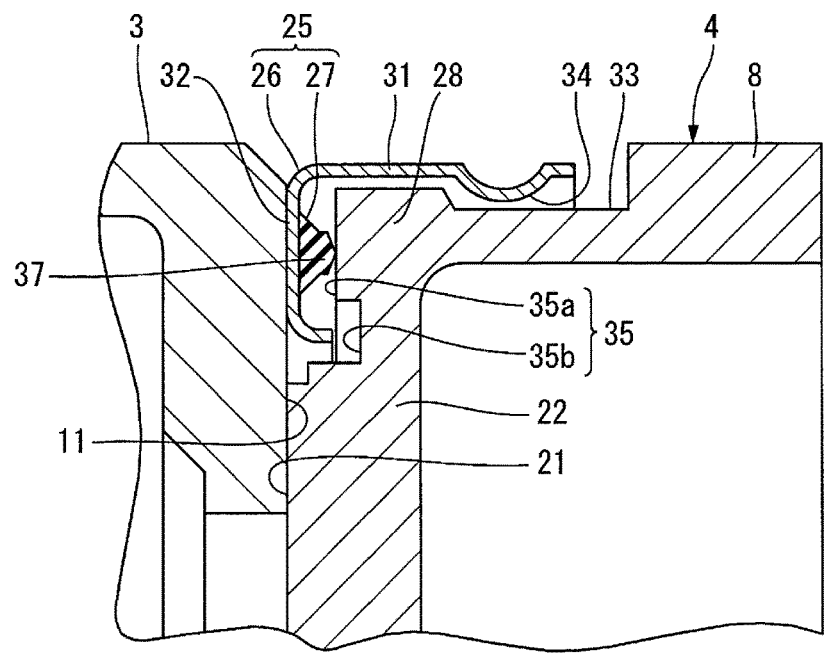
FIG. 7 is a sectional view showing an enlarged main part of the electromagnetic connection device according to the present invention, which illustrates a connection state.

The width of the abutment portion 32 in the radial direction is smaller than the width of the friction surface 11 of the rotor 3 in the radial direction. The inner edge of the abutment portion 32 is bent into a shape with the distal end pointing to the opposite side of the rotor 3. A concave portion 35 is formed in the flat portion 22 of the armature 4 facing the abutment portion 32. As shown in FIG. 7, the concave portion 35 is formed in a size capable of wholly storing the abutment portion 32.

Figure 2:
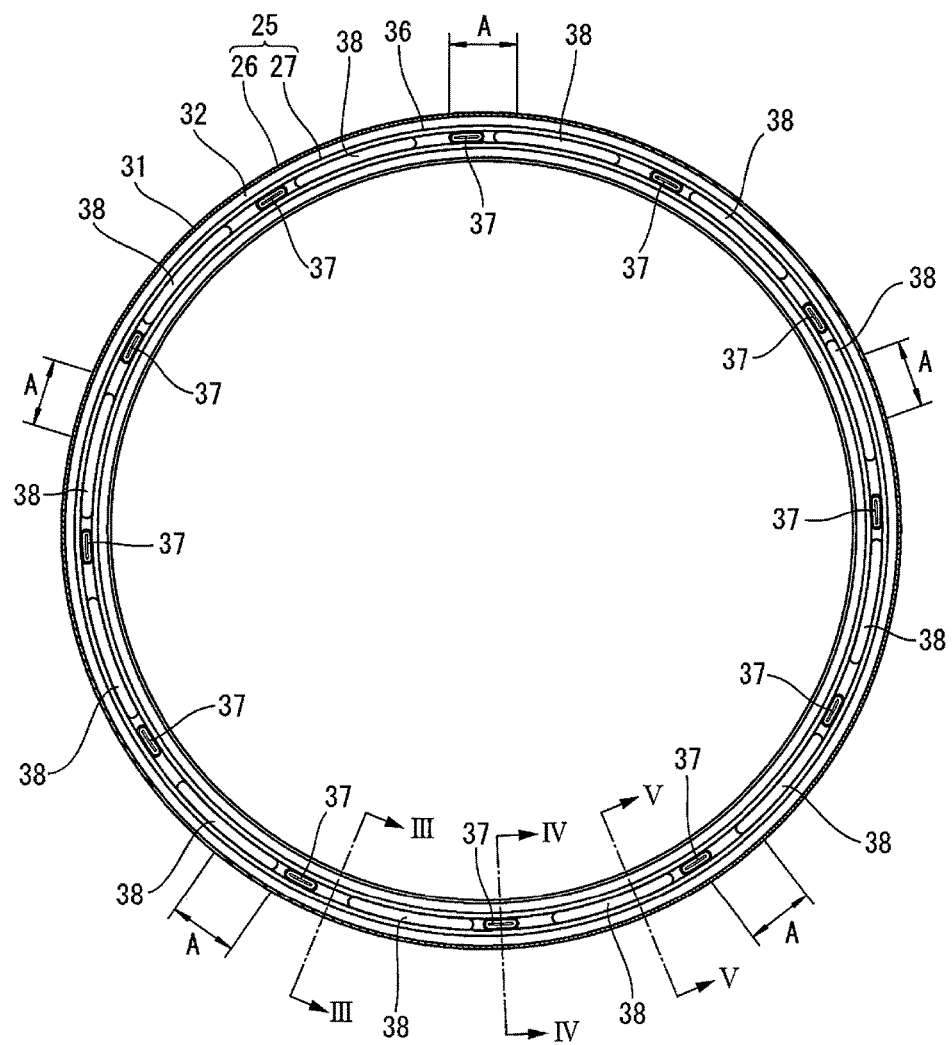
FIG. 2 is a sectional view of a damping member taken along a line II-II in FIG. 1.

As shown in FIG. 2, the elastic member 27 is formed into an annular shape extending along the abutment portion 32 while being spaced apart from the outer edge and the inner edge of the abutment portion 32. As shown in FIG. 6, the elastic member 27 according to this embodiment is made of rubber and fixed to the abutment portion 32 by vulcanization bonding so as to be sandwiched between the abutment portion 32 and the flat portion 22.

A flat pressing surface 35a perpendicular to the axis C of the input shaft 2 is formed on a portion of the flat portion 22, which contacts the elastic member 27. The pressing surface 35a viewed from the axial direction of the input shaft 2 has an annular shape. As shown in FIG. 6, the above-described concave portion 35 is formed by including the pressing surface 35a and an annular clearance groove 35b connected to the inner edge of the pressing surface 35a. As shown in FIG. 7, the clearance groove 35b is formed into a shape capable of storing the inner edge portion of the abutment portion 32.

As shown in FIG. 2, the elastic member 27 includes a base portion 36 formed into an annular shape along the abutment portion 32, and a plurality of first convex portions 37 and a plurality of second convex portions 38 both of which project from the base portion 36. The base portion 36, the first convex portions 37, and the second convex portions 38 are integrally formed by integral molding.

Figure 3:
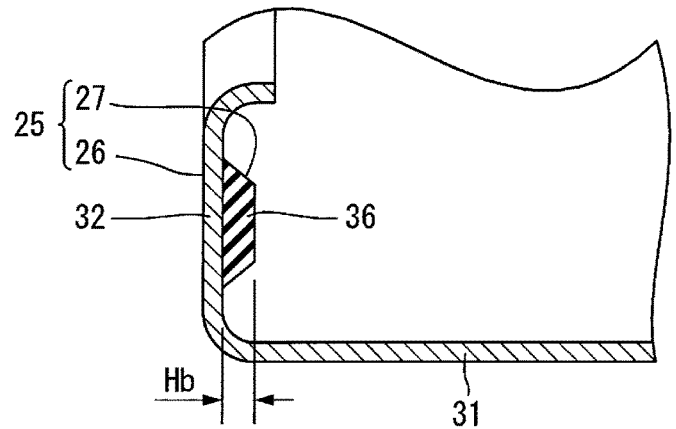
FIG. 3 is a sectional view taken along a line III-III in FIG. 2.

As shown in FIG. 3, the base portion 36 is formed to have a trapezoidal section.

Figure 4:
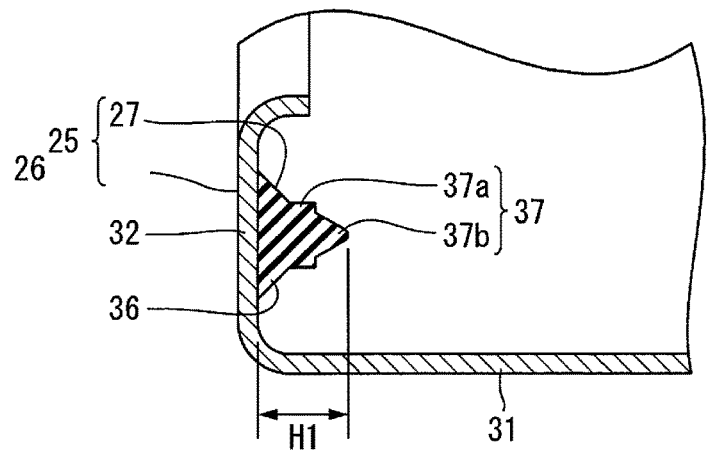
FIG. 4 is a sectional view taken along a line IV-IV in FIG. 2.

As shown in FIG. 4, the first convex portion 37 includes a columnar portion 37a projecting from the base portion 36, and a mountainous portion 37b projecting from the distal end face of the columnar portion 37a. When viewed from the axial direction of the input shaft 2, the columnar portion 37a is formed into an elliptical shape curved in the circumferential direction of the elastic member 27. The mountainous portion 37b is formed to have a mountainous section extending in the circumferential direction of the elastic member 27. A height (the length between the abutment portion 32 and the distal end of the first convex portion 37) H1 of the first convex portion 37 is about three times larger than a height Hb (see FIG. 3) of the base portion 36.

As shown in FIG. 2, the first convex portions 37 are provided at positions that divide the elastic member 27 having an annular shape into a predetermined number of parts in the circumferential direction. The first convex portions 37 according to this embodiment are provided at positions that equally divide the elastic member 27 into 12 parts in the circumferential direction. The height, volume, and number of first convex portions 37 can appropriately be changed in correspondence with the magnitude of an impact generated when the armature 4 is magnetically attracted by the rotor 3.

Figure 5:
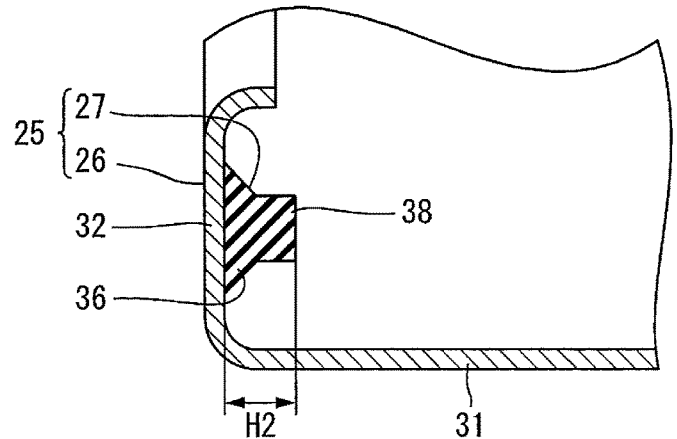
FIG. 5 is a sectional view taken along a line V-V in FIG. 2.

As shown in FIG. 5, the second convex portion 38 is formed into a columnar shape projecting from the base portion 36. As shown in FIG. 2, the second convex portions 38 are located between the plurality of first convex portions 37 arranged in the circumferential direction of the elastic member 27. When viewed from the axial direction of the input shaft 2, the second convex portion 38 is formed into an elliptical shape curved in the circumferential direction of the elastic member 27. The length of the ellipse is longer than that of the first convex portion 37. A height H2 of the second convex portion 38 is smaller than the height H1 of the first convex portion 37. The height, volume, and number of second convex portions 38 can appropriately be changed in correspondence with the magnitude of an impact generated when the armature 4 is magnetically attracted by the rotor 3.

That is, the elastic member 27 includes a plurality of convex portions (the first convex portions 37 and the second convex portions 38) whose lengths in a direction along the axis C of the input shaft 2 are different from each other.

As shown in FIG. 6, the height H1 of the first convex portion 37 is set to a height that forms a gap d narrower than the air gap G between the rotor 3 and the abutment portion 32 in a state in which the distal end of the first convex portion 37 is in contact with the pressing surface 35a of the armature 4.

The damping member 25 having the above-described structure is mounted on the outer periphery of the armature 4 in a state in which the armature 4 is assembled to the two-way clutch 5. This mounting operation is performed by putting the engaging portion 31 of the damping member 25 on the corner portion 28 of the armature 4 and pressing the damping member 25 so as to push the corner portion 28 in the engaging portion 31. By this pressing, the engaging portion 31 elastically deforms, and the projections 34 enter the annular groove 33 of the armature 4. When the projections 34 enter the annular groove 33, the damping member 25 engages with the armature 4.

In the electromagnetic clutch 1 having the armature 4, when the electromagnetic coil 14 is energized, the magnetic flux Φ (see FIG. 1) flows to the field core 13, the rotor 3, and the armature 4, and the armature 4 is magnetically attracted by the rotor 3. When the armature 4 moves from the initial position shown in FIG. 6 to the side of the rotor 3 by the magnetic attraction, the abutment portion 32 of the damper cover 26 first strikes the friction surface 11 of the rotor 3. Even after the damper cover 26 strikes the rotor 3, the armature 4 continuously moves to the side of the rotor 3.

When the armature 4 moves to the side of the rotor 3 with respect to the damper cover 26, the first convex portions 37 of the elastic member 27 are compressed and elastically deformed. When the first convex portions 37 are elastically deformed, the kinetic energy of the armature 4 decreases. When the deformation amount of the first convex portions 37 increases, and the armature 4 further moves, the second convex portions 38 strike the pressing surface 35a of the armature 4. The second convex portions 38 are compressed and elastically deformed. Hence, in the process of magnetically attracting the armature 4 to the rotor 3, the plurality of convex portions (the first convex portions 37 and the second convex portions 38) provided on the elastic member 27 are compressed sequentially from the first convex portions 37 whose height is largest (the length in the direction along the axis C of the input shaft 2 is largest).

When the second convex portions 38 are compressed, the kinetic energy of the armature 4 further decreases. After that, as shown in FIG. 7, the armature 4 is magnetically attracted by the rotor 3 in a state in which the kinetic energy is decreased by the elastic deformation of the first convex portions 37 and the second convex portions 38. At this time, the abutment portion 32 of the damper cover 26 is stored in the concave portion 35 of the armature 4.

For this reason, since the armature 4 is attracted by the rotor 3 in a state in which the moving speed lowers along with the decrease in the kinetic energy, a strike sound generated at the time of attraction becomes small. Hence, according to this embodiment, it is possible to provide an electromagnetic clutch that generates a small strike sound when the armature 4 is magnetically attracted by the rotor 3. The elastic member 27 is never exposed to the friction surface 21 of the armature 4 and never contacts the rotor 3. Hence, the elastic member 27 does not wear upon contact with the rotor 3, and no wear powder of the elastic member 27 is generated.

The elastic member 27 is supported by the armature 4 via the damper cover 26. For this reason, since the degree of freedom of the shape of the elastic member 27 becomes high, the elastic member 27 can be formed into a shape capable of relatively easily elastically deforming even if a material hard to elastically deform is used as the material of the elastic member 27. It is therefore possible to obtain the damping member 25 whose response and damping effect are both high.

The damper cover 26 according to this embodiment is put on the armature 4 from the side of the rotor 3, and when the engaging portion 31 engages with the tubular portion 8 of the armature 4, held on the tubular portion 8 so as to be movable along the axis C of the input shaft 2. For this reason, the damping member 25 can easily be mounted on the armature 4. Hence, according to this embodiment, it is possible to provide an electromagnetic clutch capable of obtaining a high damping effect and raising the productivity while preventing the elastic member 27 from being exposed to the friction surface 21 of the armature 4.

In this embodiment, the engaging portion 31 of the damper cover 26 engages with the corner portion 28 formed on the outer periphery of the armature 4, thereby assembling the damping member 25 to the armature 4. The damping member 25 can be assembled to the armature 4 without using a tool. It is therefore possible to provide an electromagnetic clutch capable of more easily assembling the damping member 25.

The elastic member 27 according to this embodiment includes the plurality of convex portions (the first convex portions 37 and the second convex portions 38) whose lengths in the direction along the axis of the input shaft 2 are different from each other. In the process of magnetically attracting the armature 4 to the rotor 3, these convex portions are compressed sequentially from the convex portions (first convex portions 37) whose length in the direction along the axis C of the input shaft 2 is largest.

For this reason, in the initial stage of the process of magnetically attracting the armature 4 to the rotor 3, the drag of the elastic member 27 becomes small. This means that when the magnetic attraction acting on the armature 4 is relatively small, the armature 4 moves with a high response.

Hence, according to this embodiment, it is possible to provide an electromagnetic clutch whose armature 4 has a higher response.

The rotor 3 and the armature 4 according to the above-described embodiment are formed into cylindrical shapes. However, the shapes of these members can appropriately be changed.

The damping member 25 according to this embodiment is mounted on the outer periphery of the armature 4. However, the present invention is not limited to this. The damping member 25 can be provided on the outer periphery of the rotor 3. The damping member 25 may be mounted on the inner surface of the armature 4 having an annular shape or on the inner surface of the rotor 3 having an annular shape.

The member that magnetically attracts the armature 4 is not limited to the rotor 3. For example, an arrangement in which the armature is magnetically attracted by the field core, as disclosed in Japanese Patent Laid-Open No. 2010-59984, can be employed. In this case, the damping member 25 is mounted on one of the armature 4 and the field core.

In the above-described embodiment, an example in which the present invention is applied to the electromagnetic clutch 1 has been explained. However, the present invention is also applicable to an electromagnetic brake.

EXPLANATION OF THE REFERENCE NUMERALS AND SIGNS

1 . . . electromagnetic clutch, 3 . . . rotor (attraction target member), 4 . . . armature, 8 . . . tubular portion (second wall), 11, 21 . . . friction surface, 14 . . . electromagnetic coil, 22 . . . flat portion (first wall), 24 . . . spring member, 25 . . . damping member, 26 . . . damper cover, 27 . . . elastic member, 28 . . . corner portion, 31 . . . engaging portion, 32 . . . abutment portion, 33 . . . annular groove, 35 . . . concave portion, 37 . . . first convex portion, 38 . . . second convex portion, C . . . axis

The invention claimed is:

1. An electromagnetic connection device comprising:
an armature that includes a contact surface formed at one end and is movable along an axis perpendicular to the contact surface;
an attraction target member including a contact surface configured to come into contact with the contact surface of the armature when the armature moves, a movement of the attraction target member in a direction along the axis being regulated;
an electromagnetic coil that generates a magnetic flux passing through the armature and the attraction target member and causes the attraction target member to magnetically attract the armature;
a spring member that biases the armature in a direction in which the armature is separated from the attraction target member along the axis; and
a damping member that is mounted on a first member that is one of the armature and the attraction target member, and faces a second member that is the other of the armature and the attraction target member,
wherein the first member includes a first wall including a contact surface to the second member and a concave portion formed outside of the contact surface, and a second wall extending from an edge portion of the first wall in the direction of the axis away from the second member, the damping member comprises:

a damper cover including an abutment portion extending along the concave portion and an engaging portion extending along the second wall; and an elastic member fixed to the abutment portion so as to be sandwiched between the concave portion and the abutment portion of the damper cover, the damper cover is put on the first member from a side of the second member, and when the engaging portion engages with the second wall, held on the second wall so as to be movable in the direction of the axis, and the concave portion is configured to store the abutment portion of the damper cover pushed by the second member in a process of attracting the armature to the attraction target member.

2. The electromagnetic connection device according to claim 1, wherein the first wall is formed into an annular plate shape, the second wall is formed into a cylindrical shape and connected to an outer periphery of the first wall, the engaging portion of the damper cover is formed into a cylindrical shape along an outer surface of the second wall and detachably engages with the second wall so as to be allowed to move in a direction along the axis by a predetermined length, the abutment portion of the damper cover is formed into an annular plate shape extending from one end of the engaging portion inward in a radial direction along the concave portion, and the elastic member is formed into an annular shape along the abutment portion.

3. The electromagnetic connection device according to claim 1 or 2, wherein the elastic member includes a plurality of convex portions whose lengths in the direction along the axis are different from each other.

* * * * *